United States Patent [19]

Grube

[11] 4,414,642

[45] Nov. 8, 1983

[54] APPARATUS FOR GENERATING THE INVERSE OF BINARY NUMBERS

[75] Inventor: Gerald W. Grube, Long Valley, N.J.

[73] Assignee: Bell Telephone Laboratories, Incorporated, Murray Hill, N.J.

[21] Appl. No.: 252,278

[22] Filed: Apr. 9, 1981

[51] Int. Cl.³ .............................................. G06F 7/52
[52] U.S. Cl. .................................................. 364/766
[58] Field of Search ............................... 364/766, 765

[56] References Cited

U.S. PATENT DOCUMENTS

| | | | |
|---|---|---|---|
| 2,936,117 | 5/1960 | Younker | 364/766 X |
| 3,229,079 | 1/1966 | Zink, Jr. | 364/766 |
| 3,378,677 | 4/1968 | Waldecker et al. | 364/766 |
| 3,551,664 | 12/1970 | Mebus | 364/766 |
| 3,633,018 | 1/1972 | Ling | 364/765 |
| 4,011,439 | 3/1977 | Bennett et al. | 364/761 |
| 4,025,773 | 5/1977 | Bennett et al. | 364/765 |
| 4,047,011 | 9/1977 | Bennett et al. | 364/765 |

OTHER PUBLICATIONS

Chiu et al. "Binary Divide Mechanism" *IBM Tech. Disclosure Bulletin* vol. 19, No. 6, Nov. 1965, pp. 2015–2017.
Ross "Self-Restoring Divide" *IBM Tech. Disclosure Bulletin*, vol. 9, No. 9, Feb. 1967, pp. 1139–1140.

*Primary Examiner*—David H. Malzahn
*Attorney, Agent, or Firm*—J. P. Kearns; H. L. Newman

[57] ABSTRACT

Apparatus for generating the inverse or reciprocal of a binary number simplifies the implementation of previous methods. A plurality of registers, a comparator subtractor and a clock circuit are used in combination to modify a long division operation to generate the desired inverse number expeditiously.

7 Claims, 2 Drawing Figures

APPARATUS FOR GENERATING THE INVERSE OF BINARY NUMBERS

FIELD OF THE INVENTION

This invention relates to apparatus for generating the inverse of a binary number.

BACKGROUND OF THE INVENTION

Those involved with the development of binary arithmetic have required the need for mechanisms for finding the inverse of a number as easily as possible. Finding the inverse or reciprocal of a number has significance in different applications: for example, oftentimes, only the period of the occurrence is known; therefore, to determine the frequency in real time, the reciprocal of the period must be obtained. Methods for obtaining the frequency of an occurrence where only the period of the occurrence is known heretofore has required complex apparatus such as that taught by H. Ling in U. S. Pat. No. 3,633,018, issued Jan. 4, 1972; W. S. Bennett in U.S. Pat. No. 4,047,011, issued Sept. 6, 1977; and W. S. Bennett in U.S. Pat. No. 4,025,773, issued May 24, 1977, respectively. Ling teaches a reciprocal convergence technique for obtaining the reciprocal of a number. This technique requires complex nonmodular hardware to carry out the method. Bennett in his disclosures describes a method of performing division by successive approximations which similarly require complex circuitry.

The above-mentioned disclosures are generally applicable for use in large digital computer systems. Therefore, the inherent complexity of the aforementioned patented methods is a major deterrent to their use. But where the reciprocal of a binary number is needed in a relatively simple application, the previously mentioned methods may be too expensive or complex to implement. For example, the reciprocal of a number may be needed in conjuction with a simple heart rate monitor, or it may be needed for ocean study experiments to determine water velocity or the interaction between waves and the ship. This procedure can be utilized to generate a pseudorandom sequence, useful in the field of broadband communication and elsewhere. The complex circuitry disclosed in the above-mentioned patents would not be compatible with such a use.

The complexity of the circuitry may lend itself to problems which tend to limit the application of the methods described in the previously mentioned patents to a large system. It is known that there are various methods for producing the reciprocal of a binary number and that those methods are generally complex.

It is an object of this invention to provide a simpler apparatus for determining the reciprocal of a binary number than any known to the prior art.

In contrast to the prior art, this invention is adaptable to low-frequency occurrences. This hardware simplification is readily amenable to integrated circuit technology and clearly represents an improvement over the prior art.

SUMMARY OF THE INVENTION

According to one embodiment of my invention, the reciprocal of a number is generated by the use of a mathematical technique similar to long division but with simplifications specific to finding the reciprocal of a binary number. This embodiment comprises the following elements for implementation: three registers, a comparator subtractor, and a clocking device. These components work in combination to produce the reciprocal of the binary number. The first register stores the binary number to be inverted. The second register initially stores a reference binary number. Upon initiation by the clocking device the binary numbers contained within the first and second registers are transferred to the comparator subtractor. The comparator subtractor circuit compares the binary number received from the first register to the binary number received from the second register. The third register stores bit-by bit the quotient value that represents the inverse of the number stored in the first register. The comparator subtractor subtracts the binary number from the first register from the reference binary number received from the second register and sends the difference back to the second register. The contents of the second register are then shifted and inputted back into the comparator subtractor to be compared once again with the binary number stored in the first register. Initially, a logical one is sent to the third register from the comparator subtractor. Then, in successive comparisons the following rules are observed: If the binary number from the second register is larger than that in the first register, a logical one is sent to the third register; if the binary number from the second register is smaller than the binary number from the first register, a logical zero is sent to the third register. In essence, therefore, the third register stores bit-by-bit a quotient value derived from successive remainders. The clocking circuit shifts the binary numbers in the third register over one place and either shifts the binary number located in the second register or loads the difference between the first and second registers into the second register, whichever is appropriate until the last digit in the reference number has been operated on.

BRIEF DESCRIPTION OF THE DRAWING

The invention will be understood from the following description when read with reference to the drawings, in which.

DETAILED DESCRIPTION

Figure 1:
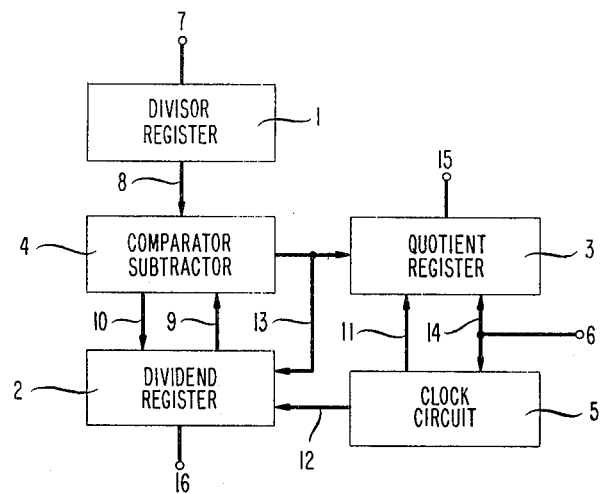
FIG. 1 is a simplified block diagram of the apparatus of this invention for generating the inverse number.

FIG. 1 depicts in block diagram form an apparatus for generating the inverse of the binary number. This apparatus comprises registers 1, 2 and 3 for storing, respectively, the number to be reciprocated, the reference numerator and the desired quotient; comparator subtractor 4 interconnecting registers 1, 2 and 3; and clock circuit 5 for regulating the operations of registers 2, and 3 and comparator subtractor 4. Register 1 receives a number to be reciprocated at terminal 7 and provides an output to comparator subtractor 4 on lead 8. Register 2 receives a reference numerator at terminal 16 and exchanges signals with comparator subtractor 4 on leads 9 and 10. Register 3 receives signals from comparator subtractor 4 on lead 13 and provides an output at terminal 15. Comparator subtractor 4 provides outputs to registers 2 and 3 on lead 13. Clock circuit 5 provides outputs to registers 2 and 3 on leads 12 and 11, respectively.

Initially, register 3 is cleared by control lead 14 in response to a start signal at terminal 6. Binary data representing the number to be inverted enters register 1 by way of terminal 7. Register 1 can be represented by two 4 bit registers connected in cascade. Commercially available registers that can be used to represent register 1 are Model No. SN7475, manufactured by Texas Instruments Incorporated. Thereafter, the binary number from register 1 is transferred to comparator subtractor 4 by way of lead 8. Register 2 is supplied with a reference binary number at terminal 16. Register 2 is commercially available as Model No. SN74199, maufactured by Texas Instruments Incorporated. Register 2 interacts with comparator subtractor 4 to produce the inverse of the binary number stored in register 1 at register 3. Comparator subtractor 4 can be implemented by two 4 bit comparator subtractors connected in cascade, such as Texas Instrument Model No. SN7483. Register 3 is commercially available as Texas Instrument Model No. 74164. This interaction will be explained more fully later in the discussion. Clock circuit 5, as before mentioned, initiates the operation on the binary number. It also alternately shifts the binary numbers located in registers 2 and 3 over one digit.

As before mentioned, register 1 transfers the number to be inverted to comparator subtractor 4 on lead 8. Register 2 simultaneously enters a reference binary number into the comparator subtractor 4 over lead 9. This reference number is chosen arbitrarily such that it is larger than the binary number received in the comparator subtractor 4 from register 1 but does not exceed twice the value stored in register 1 to ensure that the result is some positive whole number. It is also scaled so that the complete quotient is an integer, and not a fraction. In a first comparison of the binary numbers in registers 1 and 2, therefore a logical one is loaded into register 3 via control lead 13 from the comparator subtractor 4 to represent the first digit of the quotient value of the inverse of the binary number originally in register 1.

Lead 13 determines whether the difference obtained in comparator subtractor is entered or not entered into register 2 in the following manner. If the number in register 2 is larger than that in register 1, then control lead 13 sends the remainder difference generated in comparator subtractor 4 back to replace the previous number stored in register 2. If the number in register 1 is larger than that in register 2, control lead 13 inhibits the entry of any new number into register 2. The clock circuit 5 also ensures that the number located in register 2 is shifted by one bit.

Initially, comparator subtractor 4 sends the difference between the binary number to be inverted and the reference number into register 2, on data lead 10 as determined by lead 13 from register 3. Clock circuit 5 then alternately shifts the digit located in register 3 over one digit by lead 11 and either loads the difference binary number into register 2 or not, depending upon whether a one or a zero is loaded into register 3 on control lead 13, and shifts the binary number stored in register 2 over one digit by lead 12. Register 2 via lead 9 sends the binary number located within it back to the comparator subtractor 4 to be compared to the binary number from register 1. Therefore, in this embodiment register 1 stores the binary number to be inverted, and register 2 initially stores a reference number provided at terminal 16 chosen such that it is larger than the number located within register 1 but does not exceed twice the value stored in register 1.

The above-described process will repeat itself up to a predetermined number of digits determined by the number of counts preset into clock circuit 5. Once the cycles are complete, a number representing the inverse of the binary number located in register 1 has been built up bit by bit at register 3 in integer form and is available for read out at terminal 15.

Figure 2:
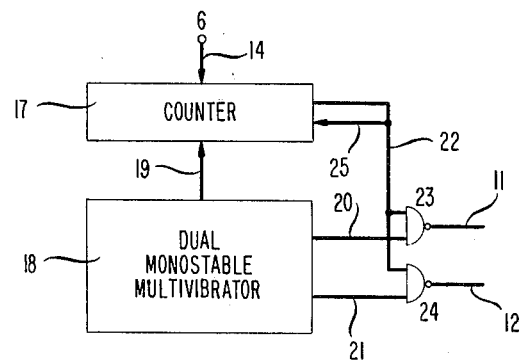
FIG. 2 is a block diagram of a clock circuit useful in the practice of this invention.

FIG. 2 is an expanded block diagram of clock circuit 5 of FIG. 1. Clock circuit 5 comprises presettable counter 17 for determining the number of successive comparisons between registers 1 and 2 of FIG. 1, dual monostable multivibrator 18 which acts as a free-running, two-phase clock to perform operations on registers 2 and 3, respectively, and NAND gates 23 and 24. NAND gates 23 and 24 act to block the outputs of two-phase dual monostable multivibrator 18 (leads 20 and 21) when presettable counter 17 has reached its overflow condition through the other inputs of gates 23 and 24. A binary counter suitable for use in this embodiment can be Model No. SN74161, manufactured by Texas Instruments Incorporated. Also, there are a variety of dual monostable multivibrators available commercially, a typical one appropriate for this application being Model No. SN74123, manufactured by Texas Instruments Incorporated.

When the start cycle is initiated at terminal 6, counter 17 which is at its overflow number is preset to some predetermined number; for instance, 8. Dual monostable 18 then toggles counter 17 for successive comparisons via control lead 19 to count from the predetermined number (in this case, 8) to the overflow number which, for a Model No. SN74161, is 15. This toggling represents the number of operations performed in registers 2 and 3 via control leads 11 and 12, respectively, as well as the number of significant digits in the quotient, i.e., inverse. When the counter 17 reaches the number 15, line 22 will change state, therby causing NAND gates 23 and 24 to block the outputs of dual monostable multivibrator 18 from operating on registers 2 and 3 in FIG. 1 through leads 11 and 12. Control lead 25, upon sensing the change in state in lead 22, disables the counter 17; thereafter, dual monostable multivibrator 18 will be inhibited from toggling the counter 17.

This invention adapts mathematical techniques of long division to find the reciprocal of a prescaled positive number. As an aid in understanding the concept of this invention, let us restrict ourselves to integer arithmetic and consider the reciprocal of the decimal number 22. The reciprocal of this number is less than one and thus cannot be an integer. Therefore, the quotient will be a prescaled version of the reciprocal $1/22 \cdot 2^n$. For the purposes of the example, let $n=9$ and assume the use of 6 bit registers. The number 22 is written in its binary form 010110, and the operation is performed in binary notation. Table 1 below summarizes the operation of the system of FIG. 1. The divisor column represents the contents of register 1, the dividend column represents the contents of register 2, the column represents the contents of register 3, and the remainder represents the contents of comparator subtractor 4.

In initial step A, registers 1, 2 and 3 and comparator subtractor 4 are cleared to contain all zeros, as shown in Table 1. In step B, a binary number, in this case, the binary representation 010110 of decimal 22, is inputted into register 1. The reference number in register 2 is a one followed at the right with as many zeros as there are digits required in the quotient. In this example 9 zeros are used.

Binary division involves a series of subtractions of the divisor from the original dividend initially and from successive remainders thereafter. If subtraction is possible with a non-negative remainder then replaces the dividend, and a new subtraction follows after the next dividend digit is brought down to the remainder. In taking a reciprocal, however, the next dividend digit is always a 0. Bringing down the next dividend digit is then equivalent to moving the remainder one place to the left. If subtraction with a non-negative remainder is not possible, then a 0 is entered in the quotient, the remainder is shifted to the left, and the subtraction is repeated. Each shift to the left is accompanied by the entry of a 0 in the quotient.

In step 1, divisor 010110 is compared with dividend 100000 and found to be smaller. It is contained once in the dividend, and a 1 is placed at the right in the quotient. The remainder obtained from the subtraction of the divisor from the dividend is 001010, as shown in the rightmost column.

In step 2 the divisor is undisturbed, but the previous remainder is left-shifted one digit and substituted in column 2 for the original dividend. When divisor and dividend are compared in step 2, it is found that the dividend is smaller than the divisor; therefore, subtraction is impossible and 0 is added to the quotient. The remainder is numerically the same as in step 1, but it is now left-shifted to add a 0 on the right.

In step 3 the dividend is clearly larger than the divisor. Consequently, another 1 is placed in the quotient column, the subtraction is carried out and the remainder is entered in the last column.

In step 4, the remainder from step 3 is left-shifted and placed with an added 0 in the dividend column. The new dividend is again larger than the divisor. Another 1 is theerfore added to the quotient and the remainder is obtained.

In step 5 finally, the remainder from step 4 is left-shifted and placed with an added 0 in the dividend column. Since the new dividend is larger than the divisor, a 1 is added to the quotient. Therefore, after reconverting the binary numbers back to decimal, it is seen that the divisor register contains the decimal number 22, the quotient register contains 23 and the remainder register contains 6. Thus, where n=9, it is observed that $2^9/22 = 23$ with a remainder of 6.

TABLE 1

|  | Divisor Register 1 | Dividend Register 2 | Quotient Register 3 | Remainder Comparator 4 |
|---|---|---|---|---|
| Step A | 000 000 | 000 000 | 000 000 | 000 000 |
| Step B | 010 110 | 100 000 (0000) | 000 000 | 000 000 |
| Step 1 Shift & Compare | 010 110 | 100 000 (0000) | 000 001 | 001 010 |
| Step 2 Shift & Compare | 010 110 | 010 100 (000) | 000 010 | 010 100 |
| Step 3 Shift & Compare | 010 110 | 101 000 (00) | 000 101 | 010 010 |
| Step 4 Shift & Compare | 010 110 | 100 100 (0) | 001 011 | 001 110 |
| Step 5 Shift & Compare | 010 110 | 011 100 | 010 111 | 000 110 |

The number initially within the dividend is some reference number which represents "1" to obtain in this particular instance some positive whole number. Those skilled in the art can readily see that the method is easily adaptable to a reference number which would allow for a positive or negative fractional or whole number in the quotient register.

Those skilled in the art also recognize that the principles of this invention in the before-mentioned example could be applied to number systems other than binary and the decimal number 22 is arbitrarily chosen for exemplary purposes only.

This circuit can be implemented in integrated circuit technology, and all of the circuit elements are realizable in TTL logic, or the like, circuits. This invention will find use in applications where low-frequency data pulses are encountered. For example, this invention can be used in ocean experiments to study water velocity, wave height and interaction of waves with ships and submarines. These marine experiments are generally low-frequency occurrences and therefore can be analyzed by use of the above-mentioned embodiment because the pulse frequency is simply defined as the reciprocal of the time between data pulses. This calculation can be performed by the before-described apparatus in real time. Furthermore, this invention can find use in such varied apparatus as heart rate monitors or automotive monitoring devices, devices in which low-frequency pulses are to be measured. Also, this invention can find use as pseudorandom sequence generator useful in broadband communication and other fields.

While this invention has been disclosed by means of specific illustrative embodiments, the principles thereof are capable of a wide range of modification by those skilled in the art within the scope of the following claims.

What is claimed is:

1. Apparatus for generating the inverse of a binary number comprising:
    a first register means for storing the binary number to be inverted,
    a second register means for initially storing a reference binary number,
    a comparison means connected to the first and second register means for either determining which of the contents of the first and second register means is greater or determining whether the contents of the first and second register means are equal, responsive to signals from the first and second register means, the comparison means also either sending a remainder difference to the second register means if the contents of the second register means is greater than or equal to the contents of the first register means or not disturbing the contents of the second register means if the contents of the first register means is greater that the contents of the second register means;
    a third register means connected to the comparison means for accepting and storing a one or zero received from the comparison means to form an integer scaled reciprocal of the binary number; and
    clock circuit means connected to the second and third register means for alternately shifting ones or zeros in the third register means over one digital position and either shifting the contents of the second register means over one digital position or shifting a binary number received from the comparison means within the second register means until a last digital position in the reference number has been operated on.

2. The apparatus of claim 1 in which said comparison means further comprises subtracting means for determining the magnitude of the difference between the contents of said first and second register means.

3. The apparatus of claim 1 in which the clock circuit means updates the contents of the second register means by a difference between the contents of the first and second register means when the contents of the second register means exceed that in the first register means, the clock circuit means shifts and increments the contents of the third register means when the contents of the second register means exceeds that in the first register means, the clock circuit means shifts the contents of the second and third register means by one bit position when the contents of the second register means is smaller than that of the first register means.

4. The apparatus of claim 3 in which the clock circuit means comprises, counting means for determining the number of comparisons to be made between the contents of the first and second register means, and two phase clocking means connected to the counting means for alternately shifting the binary number in the third register means over one digital position and either shifting the contents of the second register means over one digital position or loading the contents of the comparison means into the second register means and shifting a binary number received from the comparison means within the second register means over one digital position, the clocking means causing the counting means to count up to a predetermined limit, the counting means inhibiting the clocking means when the predetermined limit is reached.

5. The apparatus of claim 1 in which the clock circuit means comprises;

counting means for determining the number of comparisons to be made between the contents of the first and second register means, and two phase clocking means connected to the counting means and also connected to the first and second register means, the clocking means alternately shifting the binary number in the third register means over one digital position and either shifting the contents of the second register means over one digital position or shifting a binary number received from the comparison means within the second register means over one digital position, the clocking means causing the counting means to count up to a predetermined limit, and the counting means inhibiting the clocking means when the predetermined limit is reached.

6. The apparatus of claim 5 in which the two phase clock comprises;

a dual monostable multivibrator with two outputs, and logic means connected to the outputs of the multivibrator, the logic means also being connected to the counter, the logic means allowing the multivibrator to perform operations on the second and third register means when the counter has not reached the predetermined limit, the logic means preventing the multivibrator from performing operations on the second and third register means when the counter has reached the predetermined limit.

7. The apparatus at claim 6 in which the logic means is a pair of NAND gates.

* * * * *

UNITED STATES PATENT AND TRADEMARK OFFICE
CERTIFICATE OF CORRECTION

PATENT NO. : 4,414,642

DATED : November 8, 1983

INVENTOR(S) : Gerald W. Grube

It is certified that error appears in the above-identified patent and that said Letters Patent is hereby corrected as shown below:

Column 2, line 11, "bit-by bit" should read --bit-by-bit--. Column 5, line 4, after "remainder" insert --, the quotient digit is a 1. The non-negative remainder--; line 35, "theerfore" should read --therefore--; line 45, "$2 9/22=23$" should read -- $2\frac{9}{22} = 23$ --.

Column 8, Claim 6, line 20, "clock" should read -- clocking means--

Column 8, Claim 7, line 32, "at" should read -- of --.

Signed and Sealed this

Thirty-first Day of July 1984

[SEAL]

Attest:

GERALD J. MOSSINGHOFF

*Attesting Officer*  *Commissioner of Patents and Trademarks*